United States Patent
Chen et al.

(10) Patent No.: US 8,107,560 B2
(45) Date of Patent: Jan. 31, 2012

(54) METHOD AND APPARATUS FOR INTERFERENCE CANCELLATION IN COMMUNICATION SIGNAL PROCESSING

(75) Inventors: Dayong Chen, Cary, NC (US); Dennis Hui, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 2121 days.

(21) Appl. No.: 10/844,155

(22) Filed: May 12, 2004

(65) Prior Publication Data

US 2005/0254600 A1   Nov. 17, 2005

(51) Int. Cl.
H04L 27/22   (2006.01)

(52) U.S. Cl. ........ 375/324; 375/346; 375/347; 375/148; 375/332; 375/350

(58) Field of Classification Search .................. 375/324, 375/346, 148, 332
See application file for complete search history.

(56) References Cited

U.S. PATENT DOCUMENTS

| | | | |
|---|---|---|---|
| 6,400,928 B1 * | 6/2002 | Khullar et al. ............ | 455/67.11 |
| 6,463,107 B1 * | 10/2002 | Lindoff et al. ............. | 375/343 |
| 6,466,565 B1 * | 10/2002 | Wax et al. ................. | 370/342 |
| 7,133,809 B1 * | 11/2006 | Purkovic et al. ........... | 703/2 |
| 7,295,636 B2 * | 11/2007 | Onggosanusi et al. ....... | 375/346 |
| 7,313,204 B2 * | 12/2007 | Yang .......................... | 375/322 |
| 7,421,261 B2 * | 9/2008 | Sahlin et al. ................ | 455/135 |
| 2003/0063596 A1 * | 4/2003 | Arslan et al. ............... | 370/347 |
| 2004/0014424 A1 * | 1/2004 | Kristensson et al. ....... | 455/63.1 |
| 2004/0120435 A1 * | 6/2004 | Yang et al. ................ | 375/350 |
| 2005/0232174 A1 * | 10/2005 | Onggosanusi et al. ....... | 370/286 |

FOREIGN PATENT DOCUMENTS

| | | |
|---|---|---|
| WO | WO 02/096051 A1 | 11/2002 |
| WO | WO02/102008 | * 12/2002 |
| WO | WO 2004/014031 A1 | 2/2004 |

OTHER PUBLICATIONS

Beckius, "Transmit Diversity with Interference Suppression in EDGE," Master of Science Thesis in Signal Processing and Digital Communication, Dec. 2001, pp. 1-65.

* cited by examiner

Primary Examiner — Dhaval Patel
(74) Attorney, Agent, or Firm — Coats & Bennett, P.L.L.C.

(57) ABSTRACT

A method and apparatus blindly detects a received signal's modulation type characterizing an impairment component of the received signal for each postulated modulation type by determining spatial correlations between In-phase and Quadrature components of the received signal. The blind detection circuit then detects the modulation type based on the characterized impairment component. A metric generator generates a postulation metric for each postulated modulation type based on the characterized impairment component. After evaluating the postulation metrics, an evaluation circuit identifies the postulated modulation type having the best postulation metric as the modulation type of the received signal. According to an exemplary embodiment, the blind detection circuit determines a whitened noise estimate for each postulated modulation type and generates the postulation metrics based on the whitened noise estimate to reduce interference effects in the postulation metrics.

67 Claims, 5 Drawing Sheets

METHOD AND APPARATUS FOR INTERFERENCE CANCELLATION IN COMMUNICATION SIGNAL PROCESSING

BACKGROUND OF THE INVENTION

The present invention generally relates to processing received communication signals and particularly relates to interference cancellation during detection of a received signal's modulation type.

In response to an ever-increasing demand for wireless services, wireless providers continue exploring new ways to increase the capacity of current wireless networks. One way to increase network capacity, commonly referred to as frequency reuse, involves reusing the same frequencies across the wireless network. When a wireless network employs frequency reuse, multiple cells within the wireless network reuse predefined radio frequencies to transmit/receive wireless signals within the boundaries of each cell. Ideally, every cell in the wireless network reuses the same frequencies to maximize network capacity. However, this 1/1 frequency reuse plan results in significantly increased interference effects, particularly co-channel and adjacent channel interference effects. These effects cause poor speech quality, lower data throughput, call dropout, etc. As a result, current wireless networks may instead use a 1/4 frequency reuse plan to reduce the interference while still obtaining some network capacity improvement.

Interference arising from frequency reuse becomes particularly problematic in communication networks where different communication signal formats are used for different kinds of services, or to achieve different data rates, etc. For example, GSM/EDGE (Global System for Mobile communications/Enhanced Data rates for Global Evolution) networks use both Gaussian Minimum Shift Keying (GMSK) modulation and 8-ary Phase Shift Keying (8PSK) modulation. A given receiver in such networks may be expected to detect the modulation type of an incoming received signal such that it properly adjusts its received signal processing.

Such detection is referred to as "blind" detection because the receiver is expected to determine the received signal's modulation type without being provided any explicit indication. A wrong guess on the receiver's part is costly in that nonsensical results flow from processing the received signal using the wrong modulation type assumption. Significantly, received signal interference, including co-channel and adjacent channel interference arising from aggressive frequency reuse, can seriously impair conventional blind detection processing. Such impairment can be particularly problematic in single-antenna receivers.

SUMMARY OF THE INVENTION

The present invention comprises a method and apparatus for interference cancellation as part of received signal processing, and particularly comprises a method and apparatus for blind detection of a received signal's modulation type based on correlations between In-phase and Quadrature components of the received signal. According to the present invention, a blind detection circuit in a wireless receiver characterizes an impairment component of the received signal for each of two or more postulated modulation types by determining the correlations between In-phase and Quadrature components of the received signal. Using the correlations, the blind detection circuit identifies the modulation type of the received signal.

In one or more exemplary embodiments, the blind detection circuit identifies the modulation type based on the characterized impairment component. The blind detection circuit may include a metric generator configured to generate a postulation metric for each postulated modulation type based on the characterized impairment component. After evaluating the postulation metrics, an evaluation circuit identifies the postulated modulation type corresponding to the best postulation metric as the modulation type of the received signal.

In another exemplary embodiment, the blind detection circuit characterizes the impairment component by characterizing the interference effects for each of the two or more postulated modulation types based on the spatial correlations between In-phase and Quadrature components of the received signal. The blind detection circuit uses the characterized interference to reduce interference in the postulation metric determined for each postulated modulation type.

According to another embodiment of the present invention, the blind detection circuit characterizes the impairment component by applying a characteristic phase de-rotation for each postulated modulation type to the received signal to generate a de-rotated signal for each postulated modulation type, and determines interference correlations for each de-rotated signal by spatially and temporally correlating In-phase and Quadrature components of each de-rotated signal. Using the interference correlations, the blind detection circuit reduces interference in the impairment components of the postulated modulation types so that a calculated metric corresponding to the correct postulated modulation type outperforms a calculated metric corresponding to an incorrect postulated modulation type.

DETAILED DESCRIPTION OF THE INVENTION

Figure 1:
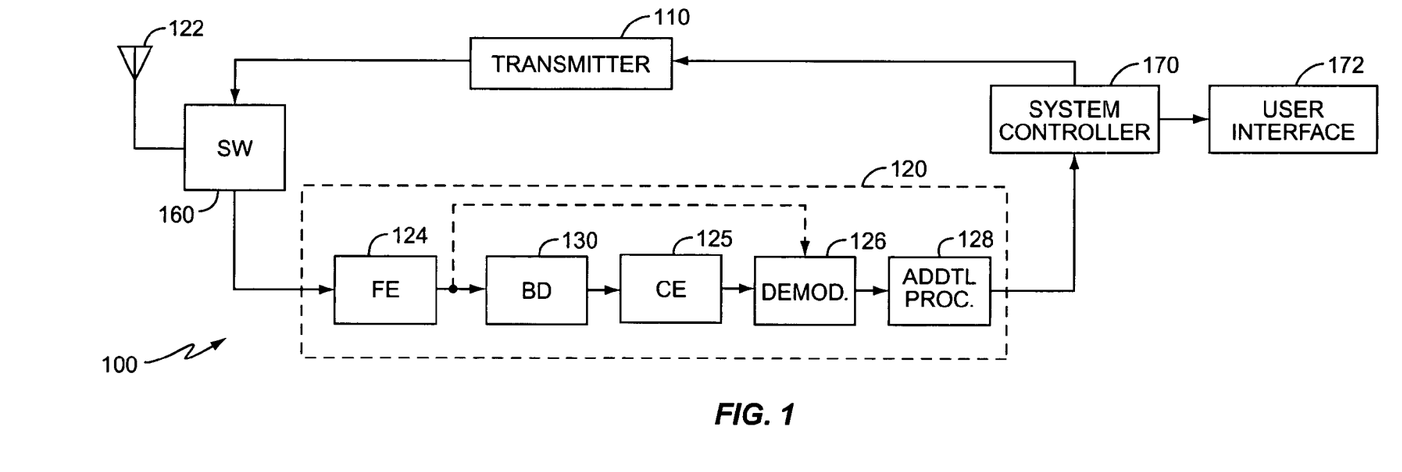
FIG. 1 illustrates an exemplary mobile terminal according to the present invention.

FIG. 1 illustrates an exemplary mobile terminal 100 according to the present invention. As used herein, the term "mobile terminal" may include cellular telephones, satellite telephones, personal communication services (PCS) devices, personal data assistants (PDAs), palm-top computers, laptop computers, pagers, and the like. Further, those skilled in the art should note the present invention is described in one or more exemplary embodiments relating to GSM/EDGE wireless communication networks, but such descriptions are not limiting. Therefore, it should be understood that the present invention has a broad range of applicability, including other wireless communication standards including, but not limited to, Universal Mobile Telecommunication System (UMTS), TIA/EIA-136, Code Division Multiple Access (CDMA), cdmaOne, cdma2000, and Wideband CDMA.

As illustrated, mobile terminal 100 includes a transmitter 110, a receiver 120, an antenna switch 160, a system controller 170, and a user interface 172. In an exemplary embodiment, system controller 170 stores and executes program instructions that control transmitter 110, receiver 120, and antenna switch 160. Further, system controller 170 interfaces the communication electronics (transmitter 110 and receiver 120) with the user interface 172. When antenna switch 160 connects transmitter 110 to antenna 122, transmitter 110 transmits wireless communication signals according to a predefined communication standard. Similarly, when antenna switch 160 connects receiver 120 to antenna 122, receiver 120 receives and processes wireless communication signals according to a predefined communication standard.

Figure 2:
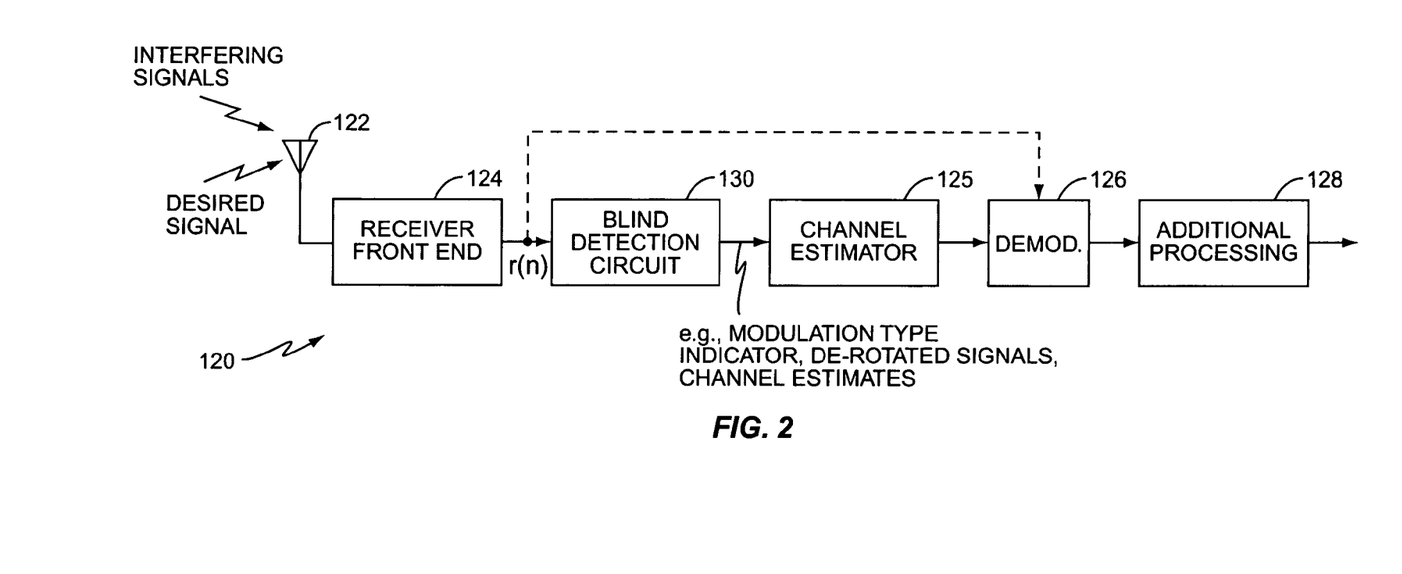
FIG. 2 illustrates an exemplary wireless receiver in the mobile terminal of FIG. 1.

FIG. 2 illustrates an exemplary embodiment of the wireless communication receiver 120 shown in FIG. 1. Receiver 120 includes front-end 124, channel estimator 125, demodulator 126, additional processor 128, and blind detection circuit 130. Front-end 124 processes a desired signal and one or more interfering signals received at antenna 122 to provide a received baseband signal r(n) to blind detection circuit 130 using filters, amplifiers, analog-to-digital converters, etc., as known in the art. Blind detection circuit 130 implements an exemplary blind modulation detection algorithm according to the present invention that uses knowledge of the training sequence included in the received signal to identify the modulation type of the received signal r(n), as discussed further below.

For example, receiver 120 may be configured such that blind detection circuit 130 identifies the modulation type of the received signal as either Gaussian Minimum Shift Keying (GMSK) modulation or 8-ary Phase Shift Keying (8PSK) modulation. Based on such detection, demodulator 126 then correctly demodulates the received signal. However, it will be appreciated by those skilled in the art that the present invention is not limited to these two modulation types, and it should be understood that the modulation postulates used for blind detection can include additional or different modulation formats.

Channel estimator 125 generates channel estimates from the received signal based on the modulation type identified by blind detection circuit 130. Alternatively, channel estimator refines channel estimates generated by blind detection circuit 130. In any case, demodulator 126 demodulates the received signal r(n) based on the modulation type identified by blind detection circuit 130 and the provided channel estimates. Alternatively, demodulator 126 demodulates a de-rotated version of the received signal provided by the blind detection circuit 130 based on the modulation type identified by the blind detection circuit 130 and the provided channel estimates. That is, detection circuit 130 may apply characteristic signal de-rotations to the received signal as part of its detection operations, and the de-rotated signal corresponding to the detected modulation type may be provided to the demodulator 126 or the demodulator 126 can operate directly on the received signal. While FIGS. 1 and 2 illustrate a receiver 120 with a separate channel estimator 125, those skilled in the art will appreciate that because the blind detection circuit 130 may provide channel estimates to demodulator 126, channel estimator 125 is optional and may be omitted.

Regardless, the demodulated values generated by demodulator 126 are then processed further, as necessary, in additional processor 128. For example, additional processor 128 may include a convolutional decoder or a turbo decoder (not shown) that performs error correction based on the demodulated values provided by demodulator 126 to determine information bit values.

As mentioned above, blind detection circuit 130 implements a blind modulation detection algorithm to identify the modulation type of the received signal r(n). The received signal r(n) provided to blind detection circuit 130 may be modeled as the sum of an impairment v(n) with the convolution of the radio channel h(n) and the transmitted symbols s(n), as shown in Equation 1:

$$r(n) = e^{j\phi n} \sum_{k=0}^{L} h(k)s(n-k) + v(n), \quad \text{(Eq. 1)}$$

where impairment v(n) includes white noise and interference components due to the interfering signals received at antenna 122, where L+1 represents the number of channel paths modeled by receiver 120, where r(n), h(n), and v(n) are complex values, and where φ denotes a characteristic rotation angle for the particular modulation in use. For example, $\phi=\pi/2$ for GMSK (GSM) and $\phi=3\pi/8$ for 8PSK (EDGE). When signal s(n) is transmitted in a densely populated area, impairment v(n) is dominated by co-channel interference, which may be as large as the desired signal. Therefore, the signal-to-noise ratio (SNR) associated with the received signal r(n) is very low, resulting in a high probability that blind detection circuit 130 will incorrectly identify the modulation type of the received signal r(n). By reducing the energy associated with the impairment v(n), the performance of blind detection circuit 130, and therefore, of receiver 120, improves.

The impairment v(n) can be modeled as an Auto-Regression (AR) process of order K (see Equation 2).

$$v(n) = \sum_{k=1}^{K} a(k)v(n-k) + e(n) \quad \text{(Eq. 2)}$$

As shown in Equation 2, the AR process uses the K previous impairment values plus a complex valued white noise e(n) to predict the current impairment v(n), and therefore, only models the correlations of v(n) in the time domain. Equation 2 may be rewritten as:

$$v(n) - \sum_{k=1}^{K} a(k)v(n-k) = e(n), \quad \text{(Eq. 3)}$$

which illustrates that the white noise e(n) may be generated from impairment v(n) by filtering the impairment v(n) with a standard Finite Impulse Response (FIR) filter. As a result, the FIR filter is a whitening filter.

Because the AR process only models the correlations of v(n) in the time domain, the whitening filter of Equation 3 is a temporal whitening filter that only cancels the interference components with strong temporal correlations from the impairment v(n). As a result, the whitened noise e(n) may still include interference components from interference signals that are weakly correlated in the time domain, such as co-channel interference signals.

The present invention addresses interference that is strongly correlated in the "spatial" domain, as defined by the In-phase (I) and Quadrature (Q) components, as well as interference that is correlated in the time domain. By exploiting such correlations within the impairment v(n), the impairment energy can be significantly reduced. Specifically, the present invention generates two signals, namely the In-phase (I) and a Quadrature (Q) component signal, from the single complex received signal r(n). Therefore, Equation 1 may be rewritten as:

$$r(n) = \begin{pmatrix} r_I(n) \\ r_Q(n) \end{pmatrix} = \Phi^n \sum_{k=0}^{L} \begin{pmatrix} h_I(k) \\ h_Q(k) \end{pmatrix} s(n-k) + \begin{pmatrix} v_I(n) \\ v_Q(n) \end{pmatrix}, \quad \text{(Eq. 4)}$$

where $\Phi \equiv \begin{pmatrix} \cos\phi & -\sin\phi \\ \sin\phi & \cos\phi \end{pmatrix}$ and $r(n) = r_I(n) + r_Q(n)\sqrt{-1}$.

Equation 4 illustrates that the transmitted signal s(n) may be estimated using either the I component of the received signal, $r_I(n)$, or the Q component of the received signal, $r_Q(n)$. As a result, Equation 4 indicates there is a strong correlation between the I and Q components of the received signal r(n). Because the I and Q components of the received signal can mathematically be treated as two received signals from two different antennas, the correlation between the I and Q components of the received signal is referred to as a spatial correlation, which thereby permits a single-antenna receiver embodiment of the present invention to nonetheless employ spatial correlation processing for interference reduction.

Using a Vector Auto-Regression (VAR) process of order 2, the I and Q components of the impairment v(n) may be modeled as shown in Equation 5.

$$v_I(n) = a_{0,0}(1)v_I(n-1) + a_{0,1}(1)v_Q(n-1) + a_{0,0}(2)v_I(n-2) + a_{0,1}(2)v_Q(n-2) + e_I(n) \ v_Q(n) = a_{1,0}(1)v_I(n-1) + a_{1,1}(1)v_Q(n-1) + a_{1,0}(2)v_I(n-2) + a_{1,1}(2)v_Q(n-2) + e_Q(n) \quad \text{(Eq. 5)}$$

Equation 5 illustrates that the I component of the modeled impairment $v_I(n)$ depends on both its own previous values (temporal correlation) and the previous values of the Q component (spatial correlation). Similarly, the Q component of the modeled impairment $v_Q(n)$ depends on both its own previous values (temporal correlation) and the previous values of the I component (spatial correlation). As such, Equation 5 models the correlation of the I and Q components of the impairment v(n) in both time and space.

When rewritten as shown in Equation 6, the modeled impairment $\ddot{V}(n)$ looks very similar to the modeled impairment of Equation 3, except that the complex-valued impairment v(n) and white noise e(n) are replaced by the corresponding I/Q vectors, $\ddot{V}(n)$ and $\ddot{E}(n)$, and the complex-valued filter coefficients, a(k), are replaced by 2×2 matrices of filter coefficients A(k), (k=1, 2).

$$\ddot{V}(n) - \sum_{k=1}^{2} A(k)\ddot{V}(n-k) = \ddot{E}(n) \quad \text{(Eq. 6)}$$

where $\ddot{V}(n) = \begin{pmatrix} v_I(n) \\ v_Q(n) \end{pmatrix}$, $A(k) = \begin{pmatrix} a_{0,0}(k) & a_{0,1}(k) \\ a_{1,0}(k) & a_{1,1}(k) \end{pmatrix}$, and $\ddot{E}(n) = \begin{pmatrix} e_I(n) \\ e_Q(n) \end{pmatrix}$.

As a result, Equation 6 also represents an FIR filtering of the vector-valued impairment $\ddot{V}(n)$ by a matrix FIR filter with the following filter taps:

$$W(0) = \begin{pmatrix} 1 & 0 \\ 0 & 1 \end{pmatrix}, W(1) = \begin{pmatrix} a_{0,0}(1) & a_{0,1}(1) \\ a_{1,0}(1) & a_{1,1}(1) \end{pmatrix}, \quad \text{(Eq. 7)}$$

$$\text{and } W(k) = \begin{pmatrix} a_{0,0}(2) & a_{0,1}(2) \\ a_{1,0}(2) & a_{1,1}(2) \end{pmatrix}$$

Because the FIR filter in Equation 6 filters the impairment in both space and time, and because the filtered result is a whitened noise vector $\ddot{E}(n)$, which typically has a lower power than $\ddot{V}(n)$, the FIR filter of Equation 6 is a spatial-temporal whitening filter. Therefore, in addition to canceling the adjacent channel interference, the FIR filter of Equation 6 also cancels co-channel interference. In other words, the spatial and temporal properties of the vector-valued impairment model of Equation 5 may be exploited to reduce both co-channel and adjacent channel interference present in a received signal received by a single antenna receiver 120.

The above formulation illustrates how separating the complex-valued impairment v(n) into its I and Q components reduces spatially and temporally correlated interference from an impairment component of the received signal by using the I and Q components to generate a whitened noise estimate for each postulated modulation type and comparing the resulting white noise estimates to determine which estimate has less energy, and therefore, less interference. The blind detection circuit 130 can use this result to detect the modulation type of the received signal. In other words, blind detection circuit 130 gains a much improved characterization of the impairment component v(n) in a received signal by exploiting the spatial and temporal correlations between the I and Q components of the received signal, thereby improving the accuracy of blind detection circuit 130. Further, in one or more embodiments, the characterization of interference thus gained can be used to benefit demodulation in demodulator 126.

Figure 3:
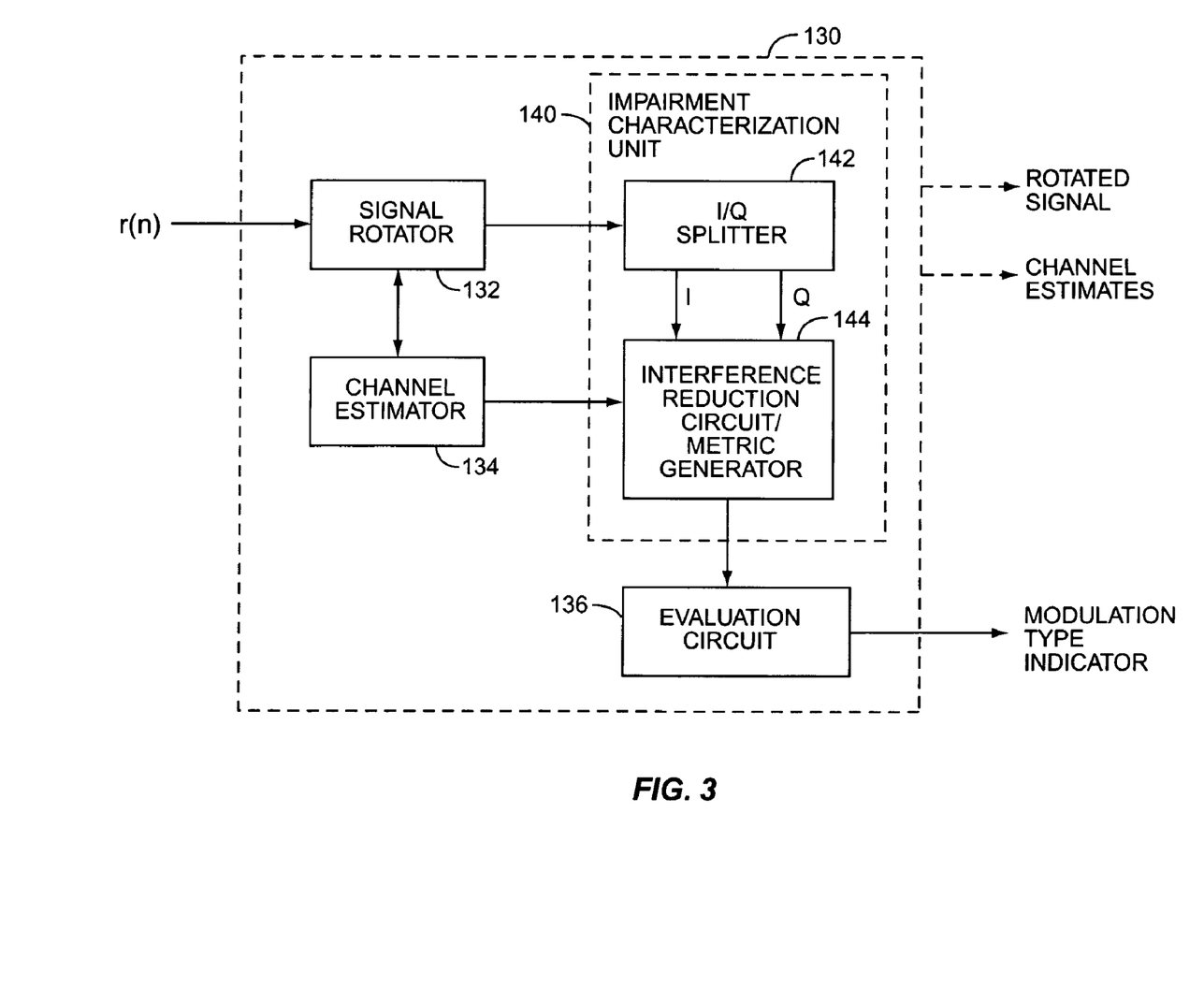
FIG. 3 illustrates an exemplary embodiment of the blind detection circuit in the wireless receiver shown in FIG. 2.

FIG. 3 illustrates an exemplary embodiment of the blind detection circuit 130 according to the present invention. Blind detection circuit comprises a signal rotator 132, a channel estimator 134, an evaluation circuit 136, and an impairment characterization unit 140. While shown as separate components, those skilled in the art will appreciate that two or more of these components may be combined into the same functional circuit. Further, those skilled in the art will appreciate that one or more of these circuits may be embodied in hardware and/or software (including firmware, software, microcode, etc.), including an application specific integrated circuit (ASIC), field programmable gate array (FPGA), etc Signal rotator 132 applies a predetermined phase de-rotation corresponding to a postulated modulation type to the received signal r(n). In an exemplary embodiment, signal rotator 132 de-rotates the received signal r(n) by $\pi/2$ to generate a GMSK postulated received signal $r_G(n)$, and de-rotates the received signal r(n) by $3\pi/8$ to generate an 8PSK postulated received signal $r_8(n)$. Using the de-rotated signals, channel estimator 134 estimates the radio channel(s) h(n) associated with each of the GMSK postulated received signal $r_G(n)$ and the 8PSK postulated received signal $r_8(n)$.

Based on the channel estimates and the postulated (de-rotated) received signals, impairment characterization unit 140 characterizes the impairment component $v_G(n)$ of the GMSK postulated received signal $r_G(n)$ by determining spatial-temporal correlations between the I and Q components of the GMSK postulated received signal $r_G(n)$. Similarly, impairment characterization unit 140 characterizes the impairment component $v_8(n)$ of the 8PSK postulated received signal $r_8(n)$ by determining spatial-temporal correlations between the I and Q components of the 8PSK postulated received signal $r_8(n)$. Evaluation circuit 136 evaluates the characterized impairment components to identify the modulation type of the received signal r(n), as discussed further below.

To characterize the impairment components for each postulated received signal, impairment characterization unit 140 includes an I/Q splitter 142 and an interference reduction circuit/metric generator 144. Based on the channel estimates and the postulated received signals, I/Q splitter 142 separates at least a portion of each postulated received signal into their I and Q components. Interference reduction circuit/metric generator 144 characterizes the impairment components of the postulated received signals through the determination of the spatial and temporal correlations in the I and Q components.

Once the interference has been suppressed from the impairment components of the postulated received signals, interference reduction circuit/metric generator 144 generates a postulation metric for each postulated modulation type that quantifies the energy present in each impairment characterization. Evaluation circuit 136 compares the resulting postulation metrics to determine the modulation type of the received signal. In general, because lower impairment component energies signify better interference cancellation, evaluation circuit 136 identifies the postulated modulation type corresponding to the smallest postulation metric as the modulation type of the received signal.

Figure 4:
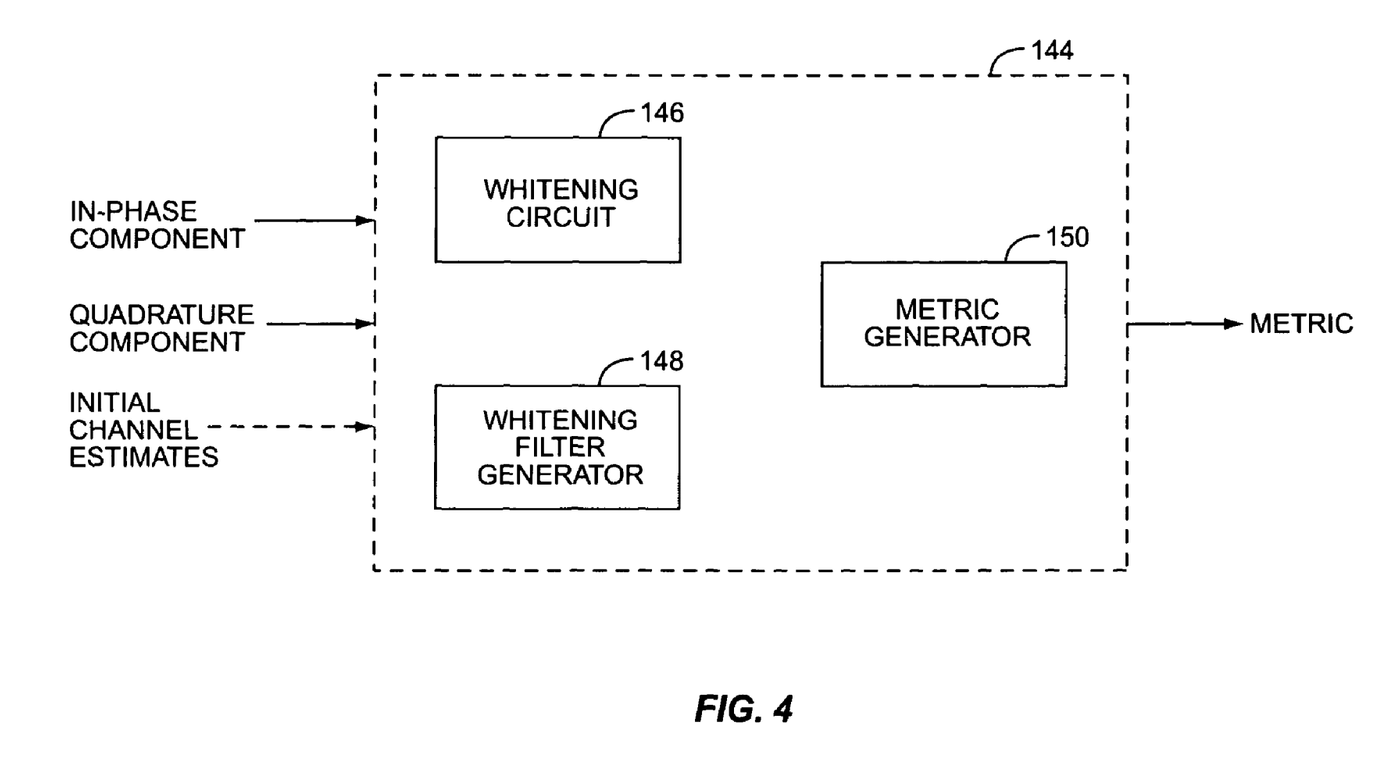
FIG. 4 illustrates an exemplary embodiment of the interference reduction circuit/metric generator in the blind detection circuit shown in FIG. 3.

An exemplary interference reduction circuit/metric generator 144 according to the present invention, shown in FIG. 4, comprises a whitening circuit 146, a whitening filter generator 148, and a metric generator 150. According to an exemplary embodiment, whitening filter generator 148 generates a whitening filter based on the spatial and temporal correlations between the I and Q components. Whitening circuit 146 applies the whitening filter to the received signal to reduce interference from the channel estimate and the impairment components using the VAR impairment model described in Equations 5-7. Because the spatial and temporal correlations of the interference signals are stronger for the postulated received signal corresponding to the correct modulation type, the whitened noise estimate corresponding to the correct modulation type should have less energy than the "whitened" noise estimate corresponding to the incorrect modulation type(s). Therefore, the whitened noise estimates may be used to generate postulation metrics used by evaluation circuit 136 to identify the modulation type of the received signal.

In summary, blind detection circuit 130 characterizes an impairment component of the received signal for each postulated modulation type by using the spatial and temporal correlations between the I and Q components of each postulated received signal to reduce interference from the impairment component. By reducing interference from each characterized impairment component based on the spatial and temporal correlations, blind detection circuit 130 generates a postulation metric corresponding to each postulated modulation type, and identifies the modulation type corresponding to the best postulation metric as the modulation type of the received signal.

Figure 5:
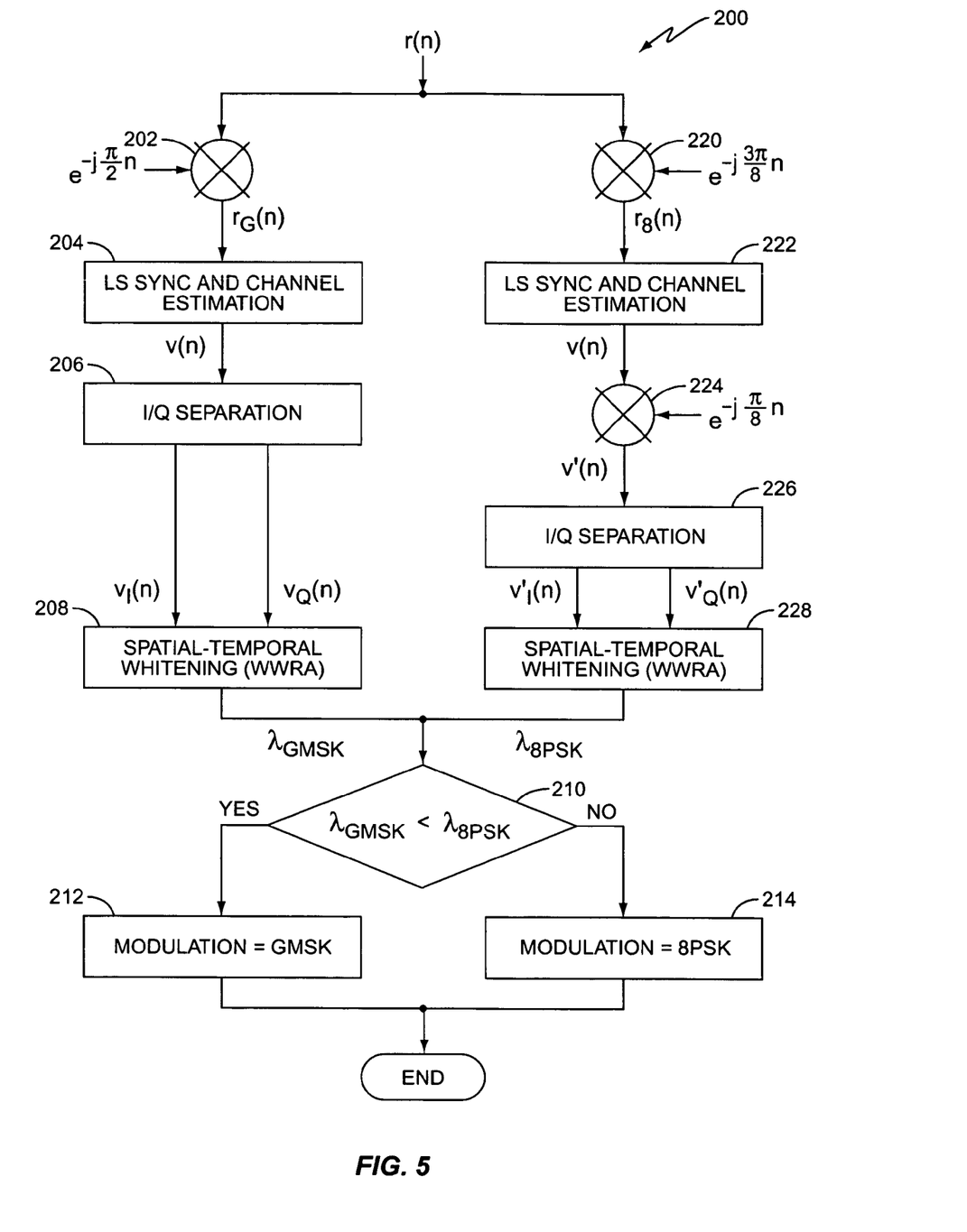
FIG. 5 illustrates an exemplary blind modulation detection technique according to the present invention.
Figure 6:
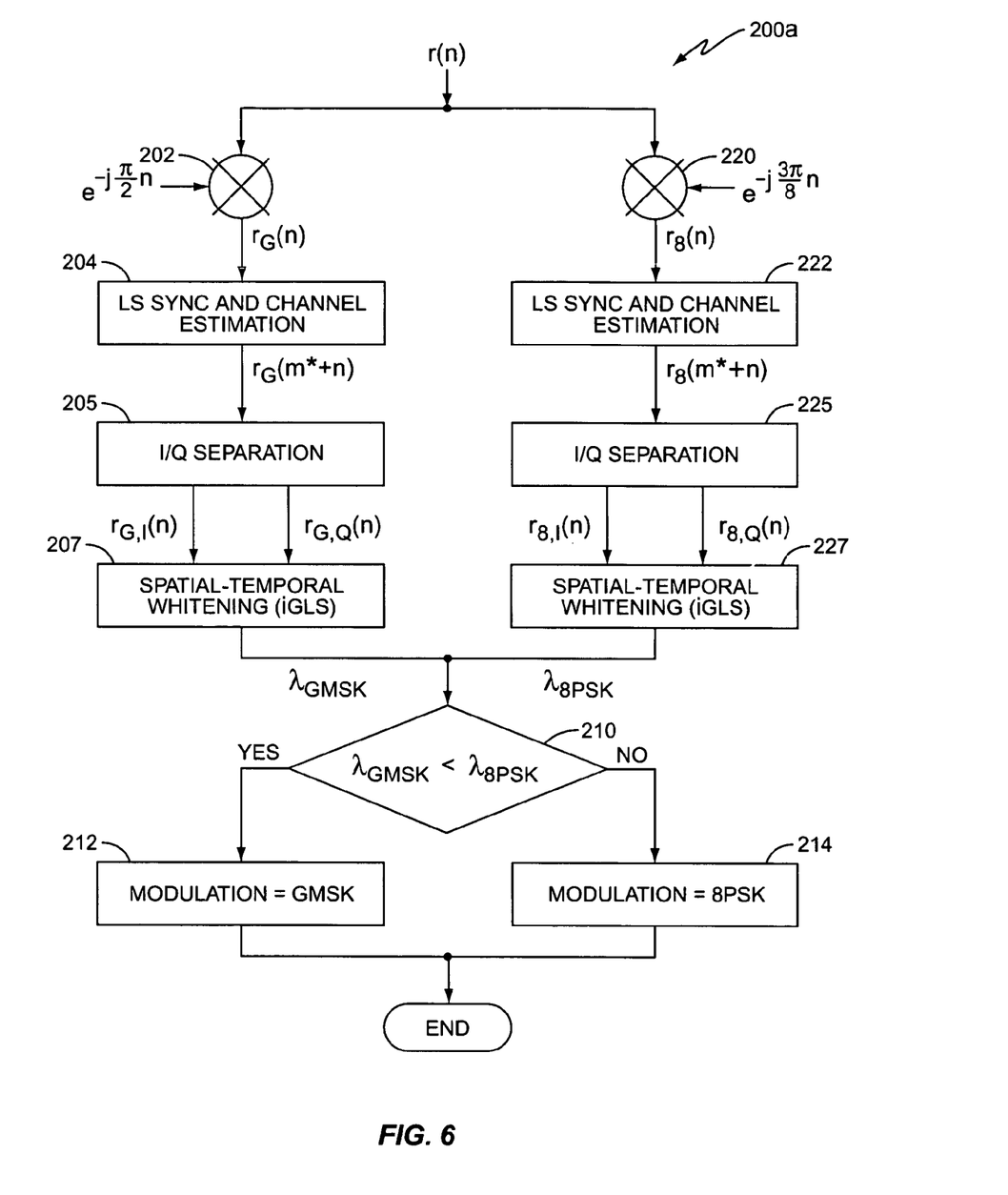
FIG. 6 illustrates another exemplary blind modulation detection technique according to the present invention.

FIGS. 5 and 6 illustrate exemplary modulation detection methods 200, 200a for implementing the blind detection process of the present invention. As mentioned above, blind detection circuit 130 uses its knowledge of the training sequences in the transmitted signal to identify the modulation type of the received signal. As such, prior to executing either blind detection method, training sequence information is stored in system controller 170. In exemplary embodiments, the following data are stored:

eight 26-symbol binary training sequences $\{s_i(n)_{n=0}^{25}: i=0, 1, \ldots 7\}$;

a window of possible starting sync positions m in the training sequence $W=\{61, 62, 63, 64, 65, 66, 67, 68, 69\}$; and eight L×(26-L) training sequence matrices $\{T_i=(S_i^H S_i)^{-1} S_i^H: i=0,1,\ldots 7\}$, one for each training sequence, where $S_i$ is computed according to:

$$S_i = \begin{bmatrix} s_i(L) & s_i(L-1) & \ldots & s_i(0) \\ s_i(L+1) & s_i(L) & \ldots & s_i(1) \\ \vdots & \vdots & \vdots & \vdots \\ s_i(25) & s_i(24) & \ldots & s(25-L) \end{bmatrix} \quad \text{(Eq. 8)}$$

According to a first method 200, illustrated in FIG. 5, signal rotator 132 de-rotates the received signal $$\{r(n)\}_{n=0}^{155}$$

by π/2 (multiplier 202) to generate the GMSK postulated received signal:

$$r_G(n) = r(n)e^{-j\frac{\pi}{2}n}. \quad \text{(Eq. 9)}$$

For each possible sync position in the synchronization window m ∈ W, channel estimator 134 computes the channel estimates using the best sync position m* to determine an impairment estimate (block 204) according to the following process. First, channel estimator 134 computes candidate channel estimates $\vec{h}_m=(h_m(0), h_m(1), \ldots, h_m(L))^T$ for each sync position m according to:

$$\vec{h}_m = T_i \vec{y}_m, \quad \text{(Eq. 10)}$$

where $\vec{y}_m = (r_G(m+L), r_G(m+L+1), \ldots, r_G(m+25))^T$. Based on the candidate channel estimates $\vec{h}_m$, channel estimator 134 computes a corresponding impairment disturbance estimate:

$$\alpha_{i,m}^2 = \|\vec{y}_m - S_i \vec{h}_m\|^2. \quad \text{(Eq. 11)}$$

The best sync position m* is selected according to:

$$m^* = \underset{m \in W}{\arg\min}\, \alpha_{i,m}^2. \quad \text{(Eq. 12)}$$

Channel estimator 134 then generates an initial GMSK channel estimate for the GMSK postulated received signal using the best sync position m* according to:

$$\vec{h}_G = (h_{m^*}(0), h_{m^*}(1), \ldots, h_{m^*}(L))^T, \quad \text{(Eq. 13)}$$

and calculates GMSK impairment estimate samples $$\{v(n)\}_{n=0}^{25-L}$$

according to:

$$v(n) = r_G(m^* + L + n) - \sum_{k=0}^{L} \vec{h}_G(k) s_i(n - k + L). \quad \text{(Eq. 14)}$$

I/Q splitter 142 separates the impairment estimate samples into their I and Q components (block 206):

$$v_I(n) = Re\{v(n)\} v_Q(n) = Im\{v(n)\}' \quad \text{(Eq. 15)}$$

and interference reduction circuit/metric generator 144 generates the GMSK postulated metric according to the following process. First, interference reduction circuit/metric gen erator 144 calculates covariance matrices C(k) for k={0, 1, 2} according to:

$$C(k) = \sum_{n=L+k}^{25} \begin{bmatrix} v_I(n) \\ v_Q(n) \end{bmatrix} [v_I(n-k) \ v_Q(n-k)]. \quad \text{(Eq. 16a)}$$

As shown above in Equation 5, the I/Q impairment is modeled as a VAR process, resulting in:

$$\begin{vmatrix} v_I(n) \\ v_Q(n) \end{vmatrix} + A_1 \begin{vmatrix} v_I(n-1) \\ v_Q(n-2) \end{vmatrix} + A_2 \begin{vmatrix} v_I(n-2) \\ v_Q(n-2) \end{vmatrix} = e(n). \quad \text{(Eq. 16b)}$$

Next, interference reduction circuit/metric generator 144 estimates the GMSK VAR coefficient matrices iteratively using a Whittle-Wiggins-Robinson Algorithm (WWRA) according to the following steps:
Initialize the WWRA algorithm $D_0=C(0)$, $S_0=C(0)$
Calculate the VAR(1) filter coefficients:

$$A_1(1) = -C(1)C^{-1}(0), \quad \text{(Eq. 17a)}$$

$$B_1(1) = C^T(1)C^{-1}(0), \quad \text{(Eq. 17b)}$$

$$D_1 = D_0 + A_1(1)C^T(1), \text{ and} \quad \text{(Eq. 17c)}$$

$$S_1 = S_0 + C^T(1)B_1^T(1), P_1 = C(2) + C(1)B_1^T(1). \quad \text{(Eq. 17d)}$$

Calculate the VAR(2) coefficients:

$$A_2(2) = P_1 S_1^{-1}, \quad \text{(Eq. 18a)}$$

$$A_2(1) = A_1(1) + A_2(2)B_1(1), \text{ and} \quad \text{(Eq. 18b)}$$

$$D_2 = D_1 + A_2(2)P_1^T. \quad \text{(Eq. 18c)}$$

Those skilled in the art will appreciate that matrix $D_2$ represents a "whitened noise estimate". By taking the determinant of $D_2$, metric generator 150 generates a GMSK postulation metric $\lambda_{GMSK}$, shown in Equation 19, which may be used by evaluation circuit 136 to identify the correct modulation type.

$$\lambda_{GMSK} = det(D_2) \quad \text{(Eq. 19)}$$

The above process associated with Equations 9-19 is repeated for the 8PSK postulated modulation type. Specifically, signal rotator 132 de-rotates the received signal $$\{r(n)\}_{n=0}^{155}$$

by $3\pi/8$ (multiplier 220) to generate the 8PSK postulated received signal (Equation 20).

$$r_8(n) = r(n)e^{-j\frac{3\pi}{8}n} \quad \text{(Eq. 20)}$$

Using Equations 10-12, channel estimator 134 computes a channel estimate for the 8PSK postulated received signal (block 222) using the best sync position m*, resulting in:

$$\vec{h}_8 = (h_{m^*}(0), h_{m^*}(1), \ldots h_{m^*}(L))^T, \quad \text{(Eq. 21)}$$

and calculates 8PSK impairment estimate samples $$\{v(n)\}_{n=0}^{25-L}$$

(block 222) according to:

$$v(n) = r_8(m^* + L + n) - \sum_{k=0}^{L} \vec{h}_8(k)s_i(n - k + L). \quad \text{(Eq. 22)}$$

The 8PSK path may then further de-rotate the initial 8PSK impairment by $\pi/8$ (multiplier 224). To appreciate the benefits of this additional de-rotation, consider the following. Assuming that the desired signal and the interfering signal are both GMSK modulated, applying the $\pi/2$ de-rotation to the received signal r(n) correctly removes the rotation in both the desired signal and in the impairment. However, when multiplier 220 applies the $3\pi/8$ de-rotation to the received signal, the desired signal and the impairment both have a residual rotation of $\pi/8$. Thus, the postulation metric corresponding to the signal de-rotated by $\pi/2$ will be better than the postulation metric corresponding to the signal de-rotated by $3\pi/8$. As a result, blind detection circuit 130 detects the correct modulation type (GMSK).

However, when the desired signal is 8PSK and the interfering signal is GMSK, applying the $\pi/2$ de-rotation to the received signal leaves a residual rotation in the desired signal and correctly removes the rotation from the interference signal, while applying the $3\pi/8$ de-rotation to the received signal removes the rotation from the desired signal and leaves a residual rotation in the interference signal. Because of the residual rotation in the interfering signal in the 8PSK path, there is an increased probability that the signal de-rotated by $\pi/2$ will generate a better postulation metric than the signal de-rotated by $3\pi/8$, resulting in an incorrect modulation type detection. To mitigate this probability, the 8PSK path may further de-rotate the impairment estimate samples by $\pi/8$ (multiplier 224) to generate modified impairment estimate samples $$\{v'(n)\}_{n=0}^{25-L}$$

according to:

$$v'(n) = v(n)e^{-j\frac{\pi}{8}(n+m^*+L)} \quad \text{(Eq. 23)}$$

to make the GMSK impairment stationary for the subsequent interference cancellation.

I/Q splitter 142 separates the modified impairment estimate samples into their I and Q components (block 226):

$$v_I(n) = Re\{v'(n)\}v_Q(n) = Im\{v'(n)\}' \quad \text{(Eq. 24)}$$

and interference reduction circuit/metric generator 144 uses the I and Q components of Equation 24 to generate the 8PSK VAR coefficient matrices according to Equations 16-18. As with the GMSK VAR coefficient matrices, $D_2$ is simply the whitened noise estimate for the 8PSK postulated received signal. By taking the determinant of $D_2$, metric generator 150 generates an 8PSK postulation metric $\lambda_{8PSK}$, shown in Equation 25, which may be used by evaluation circuit 136 to identify the correct modulation type.

$$\lambda_{8PSK} = det(D_2) \quad \text{(Eq. 25)}$$

According to a second modulation detection method 200a, shown in FIG. 6, signal rotator 132 de-rotates the received signal $$\{r(n)\}_{n=0}^{155}$$

by π/2 and by 3π/8 to generate the GMSK and 8PSK postulated received signals, respectively, as shown in Equations 9 and 20 (multipliers 202 and 220). Using Equations 10-12, channel estimator 134 generates the postulated GMSK and 8PSK channel estimates for each sync position to determine the best sync position m* for each postulated received signal (blocks 204 and 222).

Using the best sync position m*, the postulated received signal $r_x(n)$, where x represents the modulation type, over the known training sequence is provided to I/Q splitter 136, where each postulated received signal is separated into their respective I and Q components (blocks 205 and 225), as shown in Equations 26a and 26b.

$$r_8(m^*+n)=[r_{8,I}(m^*+n)r_{8,Q}(m^*+n)]^T \quad \text{(Eq. 26a)}$$

$$r_G(m^*+n)=[r_{G,I}(m^*+n)r_{G,Q}(m^*+n)]^T \quad \text{(Eq. 26b)}$$

Based on the I and Q components of the postulated received signals, interference reduction circuit/metric generator 144 constructs a vector of postulated received symbols $R_x(n)$ for each postulated received signal, as shown in Equations 27a and 27b.

$$R_8(n)=[r_{8,I}(n-1)r_{8,Q}(n-1)r_{8,I}(n-2)r_{8,Q}(n-2)]^T \quad \text{(Eq. 27a)}$$

$$R_G(n)=[r_{G,I}(n-1)r_{G,Q}(n-1)r_{G,I}(n-2)r_{G,Q}(n-2)]^T \quad \text{(Eq. 27b)}$$

Using the postulated received signal, $r_x(n)=[r_{x,I}(n)\ r_{x,Q}(n)]^T$, the vector of postulated received symbols $R_x(n)$, and vectors of the known transmitted training sequence symbols, $$S_8(n)=[s_8(n)s_8(n-1)\ldots s_8(n-L-2)]^T \text{ and} \quad \text{(Eq. 28a)}$$

$$S_G(n)=[s_G(n)s_G(n-1)\ldots s_G(n-L-2)]^T, \quad \text{(Eq. 28b)}$$

interference reduction circuit/metric generator 144 computes covariance matrices according to the indirect Generalized Least Squares (iGLS) algorithm, as shown in Equations 29a-29c, to measure the strength of the correlations between the postulated received signal $r_x(n)$, the generated vector of postulated received symbols $R_x(n)$, and the generated vectors of the known transmitted training sequence symbols (blocks 207 and 227).

$$C_{rr} = \frac{1}{26-L-2}\sum_{n=L+2}^{25} r_x(m^*+n)r_x^T(m^*+n) \quad \text{(Eq. 29a)}$$

$$C_{rz} = \frac{1}{26-L-2}\sum_{n=L+2}^{25} r_x(m^*+n)\begin{bmatrix}R_x(m^*+n)\\S(m^*+n)\end{bmatrix}^T \quad \text{(Eq. 29b)}$$

$$C_{zz} = \frac{1}{26-L-2}\sum_{n=L+2}^{25} [R_x(m^*+n)\ S(m^*+n)]\begin{bmatrix}R_x(m^*+n)\\S(m^*+n)\end{bmatrix}^T \quad \text{(Eq. 29c)}$$

Interference reduction circuit/metric generator 144 then computes a noise covariance matrix D according to Equation 30 for each postulated modulation type.

$$D=C_{rr}-C_{rz}C_{zz}^{-1}C_{rz}^T \quad \text{(Eq. 30)}$$

It will be appreciated that the mathematical operations of Equations 29a-29c and 30 operate to simultaneously estimate the whitened channel estimate and the whitening filter coefficients. As with the matrix $D_2$ of the first modulation detection method 200, matrix D corresponds to a whitened noise estimate. By taking the determinant of D, metric generator 150 generates a GMSK postulation metric $\lambda_{GMSK}$ and an 8PSK postulation metric $\lambda_{8PSK}$, as shown in Equations 19 and 25.

Regardless of the modulation detection method 200, 200a used, evaluation circuit 136 evaluates the postulation metrics to identify the modulation type of the received signal (block 210). For example, if $\lambda_{GMSK}<\lambda_{8PSK}$, then evaluation circuit 136 identifies GMSK as the modulation type of the received signal (block 212). If $\lambda_{GMSK}\geq\lambda_{8PSK}$, then evaluation circuit 136 identifies 8PSK as the modulation type of the received signal (block 214). In either case, blind detection circuit 130 provides the modulation type indicator to the demodulator 126. In some embodiments, blind detection circuit may also supply the de-rotated signal ($r_x(n)$ where x=G when the modulation type is GMSK and x=8 when the modulation type is 8PSK) and/or whitened channel estimates, as shown in FIG. 2, to the demodulator to further facilitate the demodulation process.

As shown above, the first modulation detection method 200 of FIG. 5 characterizes an impairment component for the received signal corresponding to each of the GMSK and 8PSK postulated received signals by determining spatial correlations between the I and Q components of the impairment component in the received signal (see Equations 16-18). Similarly, the second modulation detection method 200a of FIG. 6 also characterizes an impairment component for the received signal corresponding to each of the GMSK and 8PSK postulated received signals by determining spatial correlations between the I and Q components of the received signal (see Equations 29-30). As such, both methods characterize an impairment component of the received signal by determining spatial correlations between I and Q components of the received signal for each postulated modulation type, where the I and Q components may be the I and Q components of the received signal or may be the I and Q components of an impairment portion of the received signal.

The first modulation detection method 200 uses an initial channel estimate and the originally received signal to calculate the impairment, models the impairment as a VAR process using the I and Q components of the calculated impairment to whiten the initial channel estimate, and solves for the whitened noise estimate using the WWRA algorithm. Because the first modulation detection method 200 involves simple 2×2 matrix operations, the first modulation detection method 200 is computationally efficient.

Contrastingly, the second modulation detection method 200a uses the I and Q components of the received signal r(n) for each modulation type to generate the whitened channel estimate and the spatial-temporal whitening filter coefficients (VAR coefficients) simultaneously using the iGLS algorithm so that the estimation of both the channel and the VAR coefficients may benefit from the interference cancellation. Because the second modulation detection method 200a involves large covariance matrices, e.g., 13×13 matrices when L=6, the second modulation detection method 200a is computationally more complex. However, due to the simultaneous estimation and interference cancellation, the identified modulation type resulting from the second modulation detection method 200a is generally more accurate.

Simulations of the exemplary modulation detection methods 200, 200a of the present invention evaluated the first and second methods for the following signal-interference scenarios:

Case 1: GMSK modulated desired signal and interference;
Case 2: 8PSK modulated desired signal, GMSK modulated interference;
Case 3: GMSK modulated desired signal, 8PSK modulated interference;
Case 4: 8PSK modulated desired signal and interference.

The simulations showed an improved receiver performance of approximately 1.2 dB using the first modulation detection method 200, and more than 3 dB using the second modulation detection method 200a for case 1 as compared to the performance of current receivers using conventional blind detection methods. In fact, the simulations show that using the second modulation detection method 200a, the receiver performance for case 1 approaches the performance of a receiver with perfect blind modulation detection. As a result, both modulation detection methods 200, 200a improve the performance of the receiver 120 for case 1, where blind detection limits the performance of conventional receivers.

The above describes an exemplary blind modulation detection method for single antenna receivers in EDGE systems. However, those skilled in the art will appreciate that the present invention is not so limited, and may therefore be used with multi-antenna receivers and/or other modulation types.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of blindly detecting the modulation type of a received signal comprising:
   generating a postulated received signal for each of two or more postulated modulation types based on the received signal;
   characterizing an impairment component of each postulated received signal by determining spatial correlations between In-phase and Quadrature components of each postulated received signal; and
   detecting the modulation type of the received signal based on the characterized impairment components.

2. The method of claim 1 wherein detecting the modulation type of the received signal based on the characterized impairment component comprises:
   generating a metric for each postulated modulation type based on the characterized impairment component to thereby reduce interference effects in the metric; and
   evaluating the metrics to identify the modulation type of the received signal.

3. The method of claim 2 wherein evaluating the metrics to identify the modulation type of the received signal comprises identifying the postulated modulation type corresponding to the best metric.

4. The method of claim 1 wherein generating the postulated received signal for each postulated modulation type comprises de-rotating the received signal by a different phase rotation for each postulated modulation type and wherein characterizing the impairment component of each postulated received signal comprises characterizing the impairment component of each de-rotated signal by determining spatial correlations between In-phase and Quadrature components of each de-rotated signal.

5. The method of claim 4 wherein de-rotating the received signal by a different phase rotation for each postulated modulation type further comprises applying an additional de-rotation to the previously de-rotated received signal for one of the postulated modulation types to make the interference stationary.

6. The method of claim 4 wherein de-rotating the received signal by a different phase rotation for each postulated modulation type comprises:
   de-rotating the received signal by $\pi/2$ for a postulated Gaussian minimum shift keying modulation type; and
   de-rotating the received signal by $3\pi/8$ for a postulated 8-phase shift keying modulation type.

7. The method of claim 6 wherein characterizing the impairment component of the received signal for the postulated 8-phase shift keying modulation type further comprises de-rotating the characterized impairment component by $\pi/8$.

8. The method of claim 1 wherein detecting the modulation type of the received signal based on the characterized impairment component comprises:
   determining a whitened noise estimate for each postulated modulation type based on the characterized impairment component to thereby reduce interference effects in the characterized impairment component; and
   detecting the modulation type of the received signal based on the whitened noise estimate.

9. The method of claim 8 wherein detecting the modulation type of the received signal based on the whitened noise estimate comprises:
   generating a metric based on the whitened noise estimate for each postulated received signal; and
   evaluating the metrics to identify the modulation type of the received signal.

10. The method of claim 8 further comprising generating a whitening filter for each postulated modulation type based on the characterized impairment component, wherein determining the whitened noise estimate for each postulated received signal comprises filtering a noise estimate for each postulated received signal with the corresponding whitening filter to reduce interference effects in the noise estimates.

11. The method of claim 10 wherein generating the whitening filter comprises generating the whitening filter according to a Whittle-Wiggins-Robinson algorithm.

12. The method of claim 8 wherein determining the whitened noise estimate for each postulated modulation type comprises generating whitened channel estimates while generating whitening filter coefficients based on the corresponding characterized impairment component to reduce interference effects from the whitened channel estimate and the whitening filter coefficients for each modulation type.

13. The method of claim 12 wherein generating the whitened channel estimate while generating the whitening filter coefficients comprises generating the whitened channel estimate while generating the whitening filter coefficients according to an indirect Generalized Least Squares algorithm.

14. The method of claim 1 wherein characterizing the impairment component of each postulated received signal comprises characterizing interference components of each postulated received signal for each postulated modulation type by determining spatial and temporal correlations between In-phase and Quadrature components of the received signal.

15. The method of claim 1 wherein characterizing the impairment component of each postulated received signal comprises:
   de-rotating the received signal by a characteristic phase rotation value for each postulated modulation type to generate a de-rotated signal for each postulated modulation type; and
   determining interference correlations for each de-rotated signal by spatially and temporally correlating In-phase and Quadrature components of each de-rotated signal.

16. The method of claim 15 wherein characterizing the impairment component of each postulated received signal further comprises:
   using the interference correlations to reduce un-cancelled interference; and calculating a metric for each de-rotated signal based on the interference correlations.

17. The method of claim 16 wherein detecting the modulation type comprises evaluating the metrics to identify the modulation type of the received signal.

18. The method of claim 1 wherein the postulated modulation types include 8-phase shift keying and Gaussian minimum shift keying.

19. The method of claim 1 further comprising determining a whitened channel estimate for each postulated received signal and providing the whitened channel estimate corresponding to the identified modulation type to a demodulator that demodulates the received signal using the detected modulation type and the whitened channel estimate.

20. A blind detection circuit in a wireless communication receiver to determine the modulation type of a received signal, the blind detection circuit comprising an impairment characterization unit configured to characterize an impairment component of the received signal for each of two or more postulated modulation types by spatially correlating In-phase and Quadrature components of the received signal for each postulated modulation type and configured to determine the modulation type of the received signal based on the characterized impairment component.

21. The blind detection circuit of claim 20 further comprising a metric generator configured to generate a postulation metric for each postulated modulation type based on the characterized impairment component to thereby reduce interference effects in the postulation metric.

22. The blind detection circuit of claim 20 wherein the impairment characterization unit comprises an interference characterization circuit configured to reduce interference effects in the postulation metrics based on the characterized impairment component.

23. The blind detection circuit of claim 22 wherein the interference characterization circuit comprises a whitening circuit for determining a whitened noise estimate of the received signal for each postulated modulation type based on the characterized impairment component and wherein the blind detection circuit detects the modulation type of the received signal based on the whitened noise estimate.

24. The blind detection circuit of claim 23 wherein the interference characterization circuit further comprises a filter generator to generate whitening filter coefficients while the whitening circuit determines a whitened channel estimate based on the characterized impairment component to reduce interference effects from the whitened channel estimate and the whitening filter coefficients for each modulation type.

25. The blind detection circuit of claim 23 wherein the interference characterization circuit further comprises a filter generator for generating a whitening filter based on the characterized impairment component and wherein the interference reduction circuit filters a noise estimate for the received signal with the whitening filter to reduce interference effects from the noise estimates for each postulated modulation type.

26. The blind detection circuit of claim 20 wherein the blind detection circuit further comprises an evaluation circuit configured to evaluate the postulation metrics and to identify the modulation type corresponding to the best postulation metric.

27. The blind detection circuit of claim 20 wherein the blind detection circuit further comprises a signal rotator to de-rotate the received signal by a different phase rotation for each postulated modulation type.

28. The blind detection circuit of claim 20 wherein the impairment characterization unit is configured to characterize the impairment component of the received signal for each of the two or more postulated modulation types by spatially and temporally correlating In-phase and Quadrature components of the received signal for each postulated modulation type.

29. A method of blindly detecting the modulation type of a received signal comprising:
characterizing interference in the received signal for each of two or more postulated modulation types by determining spatial and temporal In-phase and Quadrature correlations for the received signal;
reducing interference in a postulation metric determined for each postulated modulation type based on the characterized interference; and
detecting the modulation type of the received signal by identifying the modulation type corresponding to a best one of the postulation metrics.

30. The method of claim 28 wherein reducing the interference in the postulation metric determined for each postulated modulation type comprises determining a whitened noise estimate for each postulated modulation type based on the characterized interference and determining the postulation metric based on the whitened noise estimate for each postulated modulation type.

31. The method of claim 30 wherein detecting the modulation type of the received signal comprises evaluating the postulation metrics to identify the modulation type of the received signal.

32. The method of claim 30 wherein determining the whitened noise estimate for each postulated modulation type comprises generating a whitened channel estimate while generating whitening filter coefficients based on the characterized interference.

33. The method of claim 30 further comprising generating a whitening filter based on the characterized interference, wherein determining the whitened noise estimate for each postulated modulation type comprises filtering a noise estimate for the received signal with the whitening filter to reduce interference effects in the noise estimates.

34. The method of claim 29 wherein characterizing the interference in the received signal for each postulated modulation type comprises:
de-rotating the received signal by a characteristic phase rotation value for each postulated modulation type to generate a de-rotated signal for each postulated modulation type; and
determining interference correlations for each de-rotated signal by spatially and temporally correlating In-phase and Quadrature components of each de-rotated signal.

35. The method of claim 34 wherein reducing interference in the postulation metric determined for each postulated modulation type comprises using the interference correlations to reduce un-cancelled interference in the postulated metrics.

36. The method of claim 35 wherein detecting the modulation type of the received signal comprises evaluating the postulation metrics to identify the modulation type of the received signal.

37. The method of claim 34 wherein applying the characteristic phase rotation value to the received signal for each postulated modulation type comprises:
de-rotating the received signal by $\pi/2$ for a postulated Gaussian minimum shift keying modulation type; and
de-rotating the received signal by $3\pi/8$ for a postulated 8-phase shift keying modulation type.

38. The method of claim 37 wherein characterizing interference in the received signal for the postulated 8-phase shift keying modulation type further comprises calculating an initial impairment component based on the $3\pi/8$ phase de-rotated signal and further de-rotating the initial impairment component by $\pi/8$ to generate a modified impairment component.

39. The method of claim 29 further comprising generating a whitened channel estimate based on the characterized interference and providing the whitened channel estimate corresponding to the identified modulation type to a demodulator that demodulates the received signal using the identified modulation type and the whitened channel estimate.

40. A blind detection circuit configured to detect the modulation type of a received signal, the detector comprising:
   an interference characterization circuit configured to characterize interference in the received signal for each of two or more postulated modulation types by determining spatial and temporal In-phase and Quadrature correlations for the received signal for each postulated modulation type;
   a metric generator configured to reduce interference in a postulation metric determined for each postulated modulation type based on the characterized interference; and
   an evaluation circuit configured to detect the modulation type of the received signal by identifying a best one of the postulation metrics.

41. The blind detection circuit of claim 40 wherein the interference characterization circuit comprises a whitening circuit for determining a whitened noise estimate of the received signal for each postulated modulation type based on the characterized impairment component and wherein the blind detection circuit detects the modulation type of the received signal based on the whitened noise estimate.

42. The blind detection circuit of claim 41 wherein the interference characterization circuit further comprises a filter generator to generate whitening filter coefficients while the whitening circuit determines a whitened channel estimate based on the characterized impairment component to reduce interference effects from the whitened channel estimate and the whitening filter coefficients for each modulation type.

43. The blind detection circuit of claim 41 wherein the interference characterization circuit further comprises a filter generator for generating a whitening filter based on the characterized impairment component and wherein the interference characterization circuit filters a noise estimate for the received signal with the whitening filter to reduce interference effects from the noise estimate for each postulated modulation type.

44. The blind detection circuit of claim 40 wherein the blind detection circuit further comprises a signal rotator to de-rotate the received signal by a different phase rotation for each postulated modulation type.

45. A method of processing a signal in a wireless network receiver comprising:
   receiving the signal at the receiver; and
   identifying the modulation type of the received signal by:
      determining spatial correlations between In-phase and Quadrature components of the received signal for each postulated modulation type to characterize interference components of the received signal for each postulated modulation type;
      reducing interference in a postulation metric determined for each postulated modulation type based on the characterized interference components; and
      identifying the postulated modulation type corresponding to the best postulation metric as the modulation type of the received signal.

46. The method of claim 45 further comprising demodulating the received signal according to the identified modulation type.

47. The method of claim 45 wherein reducing interference in the postulation metric determined for each postulated modulation type comprises determining a whitened noise estimate for each postulated modulation type based on the characterized interference and determining the postulation metric based on the whitened noise estimate for each postulated modulation type.

48. The method of claim 47 wherein determining the whitened noise estimate for the received signal comprises generating a whitened channel estimate while generating whitening filter coefficients based on the characterized interference.

49. The method of claim 47 further comprising generating a whitening filter based on the characterized interference, wherein determining the whitened noise estimate comprises filtering a noise estimate for the received signal with the whitening filter to reduce interference effects in the noise estimates.

50. The method of claim 47 further comprising determining a whitened channel estimate based on the characterized interference and providing the whitened channel estimate corresponding to the identified modulation type to a demodulator that demodulates the received signal using the identified modulation type and the whitened channel estimate.

51. The method of claim 45 wherein characterizing the interference components of the received signal for each postulated modulation type comprises:
   de-rotating the received signal by a characteristic phase rotation for each postulated modulation type to generate a de-rotated signal for each postulated modulation type; and
   determining interference correlations for each de-rotated signal by spatially and temporally correlating In-phase and Quadrature components of each de-rotated signal.

52. The method of claim 45 wherein determining spatial correlations between In-phase and Quadrature components of the received signal for each postulated modulation type comprises determining spatial-temporal correlations between In-phase and Quadrature components of the received signal for each postulated modulation type.

53. A receiver for receiving a signal in a wireless network comprising:
   a blind detection circuit configured to determine the modulation type of the received signal, the blind detection circuit comprising:
      an impairment characterization unit configured to characterize an impairment component of the received signal for each of two or more postulated modulation types by spatially correlating In-phase and Quadrature components of the received signal for each postulated modulation type; and
      a metric generator configured to generate a postulation metric for each postulated modulation type based on the characterized impairment component to thereby reduce interference effects in the postulation metric.

54. The receiver of claim 53 wherein the impairment characterization unit comprises an interference characterization circuit configured to reduce interference effects in the postulation metrics based on the characterized impairment component.

55. The receiver of claim 54 wherein the interference characterization circuit comprises a whitening circuit for determining a whitened noise estimate of the received signal for each postulated modulation type based on the characterized impairment component and wherein the blind detection circuit detects the modulation type of the received signal based on the whitened noise estimate.

56. The receiver of claim 55 wherein the interference characterization circuit further comprises a filter generator to generate whitening filter coefficients while the whitening circuit determines a whitened channel estimate based on the characterized impairment component to reduce interference effects from the whitened channel estimate and the whitening filter coefficients for each modulation type.

57. The receiver of claim 56 wherein an indirect Generalized Least Squares algorithm generates the whitened channel estimate and the whitening filter coefficients.

58. The receiver of claim 55 wherein the interference characterization circuit further comprises a filter generator for generating a whitening filter based on the characterized impairment component and wherein the interference reduction circuit filters a noise estimate for the received signal with the whitening filter to reduce interference effects from the noise estimate for each postulated modulation type.

59. The receiver of claim 58 wherein the filter generator generates the whitening filter based on a Whittle-Wiggins-Robinson algorithm.

60. The receiver of claim 53 wherein the blind detection circuit further comprises an evaluation circuit configured to evaluate the postulation metrics and to identify the modulation type corresponding to the best postulation metric.

61. The receiver of claim 53 wherein the blind detection circuit further comprises a signal rotator to de-rotate the received signal by a different phase rotation for each postulated modulation type.

62. The receiver of claim 61 wherein the signal rotator de-rotates the received signal by a $\pi/2$ phase rotation for a postulated Gaussian minimum shift keying modulation type and wherein the signal rotator de-rotates the received signal by a $3\pi/8$ phase rotation for a postulated 8-phase shift keying modulation type.

63. The receiver of claim 62 wherein the signal rotator applies an additional $\pi/8$ phase de-rotation to the characterized impairment component corresponding to the postulated 8-phase shift keying modulation type.

64. The receiver of claim 53 wherein the blind detection circuit determines the modulation type of the received signal based on spatial and temporal correlations between In-phase and Quadrature components of the received signal for each postulated modulation type.

65. The receiver of claim 53 further comprising a demodulator for demodulating the received signal based on the received signal's modulation type.

66. The receiver of claim 65 wherein the impairment characterization unit comprises a whitening circuit for determining a whitened channel estimate for the received signal based on the characterized impairment component and wherein the blind detection circuit provides the whitened channel estimate corresponding to the received signal's modulation type to the demodulator.

67. The receiver of claim 53 wherein the receiver is disposed in a mobile station.

* * * * *

UNITED STATES PATENT AND TRADEMARK OFFICE
CERTIFICATE OF CORRECTION

PATENT NO. : 8,107,560 B2
APPLICATION NO. : 10/844155
DATED : January 31, 2012
INVENTOR(S) : Chen et al.

It is certified that error appears in the above-identified patent and that said Letters Patent is hereby corrected as shown below:

In Column 7, Line 60, delete "$S_i^H$: i=0,1,.....7},” and insert -- $S_i^H$: i=0,1,.....,7}, --, therefor.

In Column 9, Lines 12-14, in Equation (16b), delete "$\begin{vmatrix} v_I(n-1) \\ v_Q(n-2) \end{vmatrix}$," and insert -- $\begin{vmatrix} v_I(n-1) \\ v_Q(n-1) \end{vmatrix}$ --, therefor.

Signed and Sealed this
Nineteenth Day of June, 2012

David J. Kappos
*Director of the United States Patent and Trademark Office*